United States Patent [19]
Voelker

[11] Patent Number: 5,832,071
[45] Date of Patent: Nov. 3, 1998

[54] ELECTRONIC PATCHING SYSTEM FOR TELECOMMUNICATIONS DEVICES

[75] Inventor: Joseph L. Voelker, San Ramon, Calif.

[73] Assignee: Voelker Technologies, Inc., San Ramon, Calif.

[21] Appl. No.: 991,581

[22] Filed: Dec. 16, 1997

Related U.S. Application Data

[63] Continuation of Ser. No. 562,974, Nov. 24, 1995.

[51] Int. Cl.$^6$ .................................................... H04M 1/00
[52] U.S. Cl. ...................... 379/165; 379/163; 379/166; 379/15; 379/335
[58] Field of Search .................................. 379/1, 6, 9, 10, 379/15, 31, 32, 34, 156, 157, 163, 164, 165, 166, 335, 336, 343

[56] References Cited

U.S. PATENT DOCUMENTS

| | | | |
|---|---|---|---|
| 3,660,611 | 5/1972 | Knollman et al. | |
| 4,018,997 | 4/1977 | Hoover et al. | 379/156 |
| 4,096,359 | 6/1978 | Barsellotti | 379/166 |
| 4,140,885 | 2/1979 | Verhagen | 379/166 |
| 4,196,316 | 4/1980 | McEowen et al. | 379/157 |
| 4,796,294 | 1/1989 | Nakagawara | 379/166 |
| 5,027,345 | 6/1991 | Littlewood et al. | 379/165 |
| 5,073,923 | 12/1991 | Offers et al. | 379/165 |
| 5,251,254 | 10/1993 | Tanigawa et al. | 379/165 |
| 5,463,676 | 10/1995 | Ohsawa | 379/67 |
| 5,513,256 | 4/1996 | Komuro | 379/156 |
| 5,572,570 | 11/1996 | Kuenzig | 379/1 |

*Primary Examiner*—Forester W. Isen
*Assistant Examiner*—Binh K. Tieu
*Attorney, Agent, or Firm*—Harris Zimmerman

[57] ABSTRACT

An electronic patching system includes a first plurality of ports connected to the terminations of a plurality of telephone and data lines from the utility central office, and a second plurality of ports wired to a plurality of telecommunications devices. Both pluralities of ports are coupled to inputs of a controlled switching matrix, which connects each of the telecommunications devices to one or more of the telephone and data lines. The switching matrix is operated by a programmable logic array that directs the matrix to establish and maintain the desired connections between the telephone equipment and the telephone and data lines, computer network lines, and the like. The switching matrix includes a high voltage switch portion to handle analog telephone instruments. An algorithm for controlling the programmable logic array is created using a personal computer, and stored in memory. The algorithm comprises a database program that provides a graphical user interface on the computer display to indicate the desired connection scheme between the telephone devices and telephone lines and computer networks. The computer is provided with software to convert the database program to instructions for setting the PLA and operating the switching matrix. The connection scheme of all telephone devices may be displayed on-screen by the personal computer at any time, and the connection scheme may be easily altered to accommodate personnel movement, changes in telecommunications devices, and office reconfigurations. A line test subroutine may be included in the controller, so that the telephone/data line and connecting line to each telephone device may be checked with a test signal every time the line is used.

19 Claims, 7 Drawing Sheets

ELECTRONIC PATCHING SYSTEM FOR TELECOMMUNICATIONS DEVICES

REFERENCE TO RELATED APPLICATION

This application is a continuation of patent application Ser. No. 08/562,974, filed Nov. 24, 1995, for which priority is claimed.

BACKGROUND OF THE INVENTION

The present invention relates to patching systems that connect telephones and other telecommunications equipment to telephone and data lines, and more particularly to an electronic system for achieving this purpose.

Telephone service to businesses and institutions having more than approximately 20 telephones (or other telecommunications devices) involves complex wiring connections. Each office must have the ability to access any network or a plurality of different phone lines having telephone number designations that are switched by the telephone utility central office. Typically, each floor of an office building has at least one "patch closet", a small room which houses a patch board. The patch board generally embodies two sets of jack-type connectors, one set comprising the termination of the telephone and data lines from the utility central office, and the other set of connectors comprising the connections to the telephone sets, facsimile machines, modems, and other communications devices in use in the offices on the respective floor (or portion thereof) of the office building. To join the telephone and data lines to the communications devices, a plurality of patch cables are placed manually, each having one end plugged into a selected one of the first set of connectors and the other end likewise plugged into a selected second connector. Each patch cable associates one telephone or telecommunications device with at least one telephone and data line, so that a caller may reach the desired telephone or telecommunications device by dialing the predetermined telephone number that identifies the associated line.

Although this connection arrangement is simple in concept, the patch board connections may become extremely confusing when a large number of telephone and data lines are connected to a larger number of telephone devices. Most businesses are in a constant state of flux, due to personnel movement such as new hires and layoffs, promotions, and lateral movements among various departments. In addition, new equipment such as computers, facsimile machines, modems, and the like require new connections to telephone and data lines. As a result of these changes, a patch board that may have been arranged initially with a logical layout often becomes a confusing jumble of wires. The tangle of wires presents a daunting labor problem: no individual wants to take responsibility for removing a wire (and breaking a connection that may be vital), but new wires are added to connect new equipment and accommodate personnel movement.

Moreover, no manager in an organization wants to accept the budget liability for the many man-hours required to trace patch board connections and restore order to the system. An out-of-control patch board system typically leads to over-purchase of equipment, security problems, and too much time wasted in connecting equipment and accommodating personnel movement. The problem is multiplied in organizations that have multiple locations, or multiple floors in a single building. Indeed, patch board problems have become the rule, rather than the exception, in medium to large companies. There is currently no system known in the prior art for resolving patch board connection problems in telecommunications systems.

SUMMARY OF THE PRESENT INVENTION

The present invention generally comprises an electronic patching system that replaces existing telephone patching systems and overcomes the problems with such systems. The system includes a first plurality of ports that are connected to the terminations of a plurality of telephone and data lines from the utility central office, and a second plurality of ports that are wired to a plurality of telecommunications devices, such as telephone sets, facsimile machines, modems, and the like. Both pluralities of ports are coupled through transformer/isolator devices to inputs of a controlled switching matrix, which selectively connects each of the telecommunications devices to one or more of the telephone and data lines.

The controlled switching matrix is operated by a programmable logic array or the like that directs the matrix to establish and maintain the desired connections between the telephone equipment and the telephone lines, computer network lines, and the like. The switching matrix may include a high voltage switch portion to handle analog telephone instruments. An algorithm for controlling the programmable logic array is created using a personal computer or the like, and stored in memory. The algorithm preferably comprises a database program that provides a graphical user interface on the personal computer display to indicate the desired connection scheme between the telephone devices and telephone lines and computer networks. The device includes a programming connection such as an Ethernet port, and the personal computer is provided with software to convert the database program to instructions for setting the PLA and operating the switching matrix.

Electronic patch connection between telephone devices and telephone lines and computer networks not only eliminates the tangled mass of patch cords found in prior art manually connected patch systems, it also offers new features that greatly improve telephone service in an office or institutional setting. The connection scheme of all telephone devices may be displayed on-screen by the personal computer at any time, so that communications management is relieved of the burden of wire tracing through prior art patch boards. Moreover, the connection scheme may be easily altered to accommodate personnel movement, changes in telecommunications devices, and office reconfigurations. In addition, the system may be programmed to change the connection scheme in accordance with a timed schedule, so that changes in connections may be made for business hours and after hours functions, weekend and holiday connection schemes, and the like.

Another significant feature of the electronic patching system is a test function for all switched lines. A line test subroutine may be included in the controller, so that the telephone or data line and connecting line to each telephone device may be checked with a test signal every time the line is used. The line testing hardware includes a test pattern generator that emits a predetermined data pattern, which is then connected to the one conductor of the switched line. The data pattern is received through the other conductor of the switched line and compared to the original test pattern. If the comparison is valid, the telephone connection is completed in accordance with the programmed scheme; otherwise, remedial action may be taken. The testing subroutine requires only a few microseconds to complete, so that the user is unaware of the test.

Furthermore, a plurality of programmable patch systems may be controlled from a single personal computer, so that large scale connectivity may be directed from a single source. This feature permits a communications manager of a large organization to maintain a real-time mastery of the telecommunications functions of the organizations.

DESCRIPTION OF THE PREFERRED EMBODIMENT

The present invention generally comprises an electronic patching system for connecting a plurality of telephone and data lines from the utility central office to a plurality of telecommunications devices, such as telephone sets, facsimile machines, modems, and the like.

Figure 1:
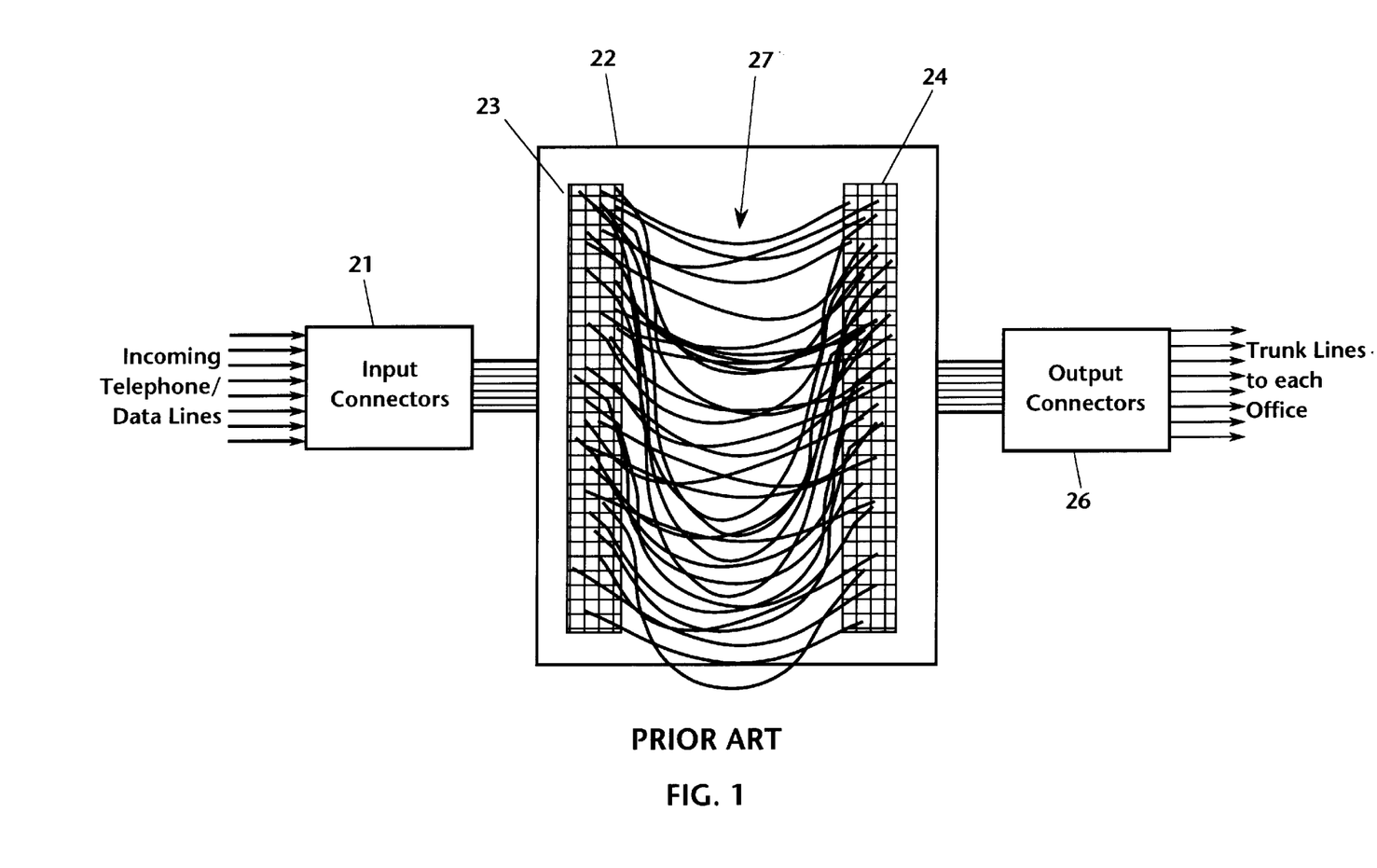
FIG. 1 is a block diagram depiction of a typical prior art patch board arrangement for connecting telephone and data lines to telecommunications devices.

The present invention is designed to replace and supplant prior art manual patching systems and practice, and depicted in FIG. 1. Typically, a prior art patching system includes a patch board 22 provided with a first set of connector jacks 23 and a second set of connector jacks 24. A plurality of incoming telephone lines and data lines from a telecommunications utility or the like are joined to input connectors 21, which are connected to respective connector jacks 23 by a standard cable connector interface or the like. Each of the telephone and data lines is labeled by an assigned individual telephone number, and accessed by operation of the telephone utility switch, as is well-known in the prior art. The connector jacks 24 are also wired through a standard connector interface to output connectors 26, which in turn lead to trunk lines and/or two-wire or four-wire connections to telephone and telecommunications devices.

The most prominent feature of a prior art patch board system comprises a plurality of patch cables 27, with the ends of each patch cable being manually plugged into and connected between a selected connector 23 and a selected connector 24. Each cable 27 thus associates each telephone line (and its assigned telephone number) with one telecommunications device. It is only the correct placement of each patch cable that enables, e.g., a caller to reach a desired individual by dialing a predetermined telephone number. When the number of patch cables grows large, it is extremely difficult to visually determine the existing connection pattern, and the manual effort required to maintain, modify, trace, and add connections becomes an extraordinarily burdensome task. The ongoing labor costs devoted to such systems is a significant expense, and the complexity of the system causes unnecessary telecommunications equipment purchases and duplication.

Figure 2:
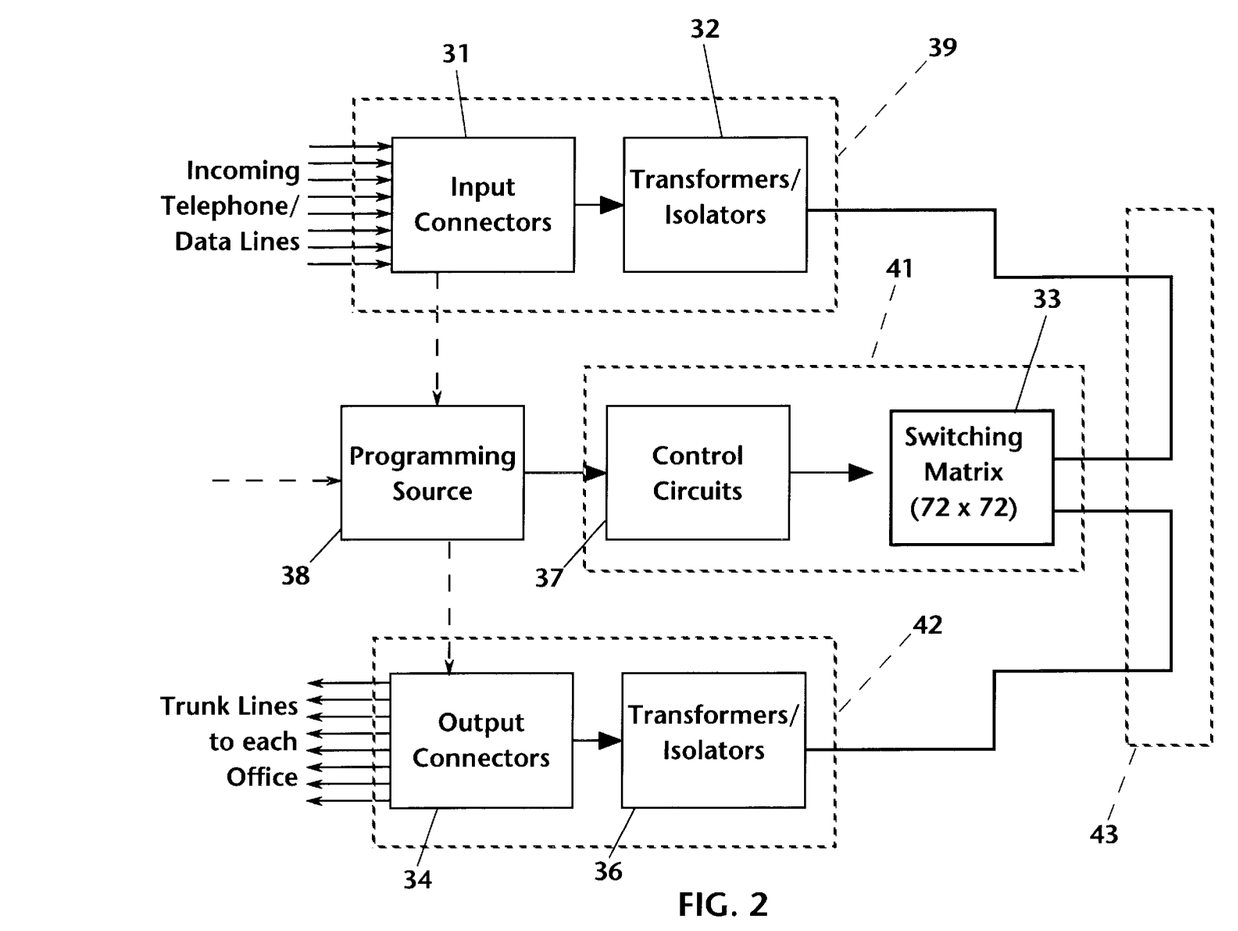
FIG. 2 is a functional block diagram of the electronically programmable patching system of the present invention for connecting telephone and data lines to telecommunications devices.

With regard to FIG. 2, the present invention overcomes the difficulties due to patch wiring complexity in patch board systems by providing an electronic connection arrangement that eliminates the patch wiring entirely. A plurality of incoming telephone lines and data lines from a telecommunications utility are joined to input connectors 31, which in turn are connected to transformers/isolators 32. The devices 32 form an isolation barrier between the external telephone system and the electronic system of the invention. The isolated incoming telephone and data lines are connected to individual ports of a switching matrix 33 such as, but not limited to, a 72×72 switching matrix.

A plurality of trunk lines and data lines extending to telephone instruments and telecommunications devices in the immediate area of the system are joined to output connectors 34, which are wired to transformers/isolators 36. The devices 36 comprise an isolation barrier between the telephones and telecommunications devices and the electronic system of the invention. The isolated lines from devices 36 are connected to individual ports of the switching matrix 33. The matrix 33 preferably includes an orthogonal layout with a plurality of X ports and a plurality of Y ports. The incoming telephone and data lines are connected to the X ports, the trunk lines and data lines from the telephones and telecommunications devices are connected to the Y ports, and the switching matrix 33 provides the desired connection pattern between the X and Y ports.

The system further includes control circuits 37 that direct the switching matrix 33 to establish the desired connection patterns between the X and Y ports thereof. A programming source 38 operates the control circuits 37, using a predetermined algorithm, and it is extremely significant that the programming source 38 permits establishment of connections, alterations, and additions to the connection pattern without any physical change in any wiring of the system.

A preferred arrangement of the electronic programmable patching system of the invention places the input connectors 31 and the transformers/isolators 32 on an input/output circuit board 39. The output connectors 34 and transformers/isolators 36 are placed on another input/output circuit board 42, and the control circuits 37 and switching matrix 33 may be placed on a mother/port circuit board 41. The circuit boards 39, 41, and 42 may be interconnected by a backplane bus 43, as is well-known in the prior art.

Figure 3:
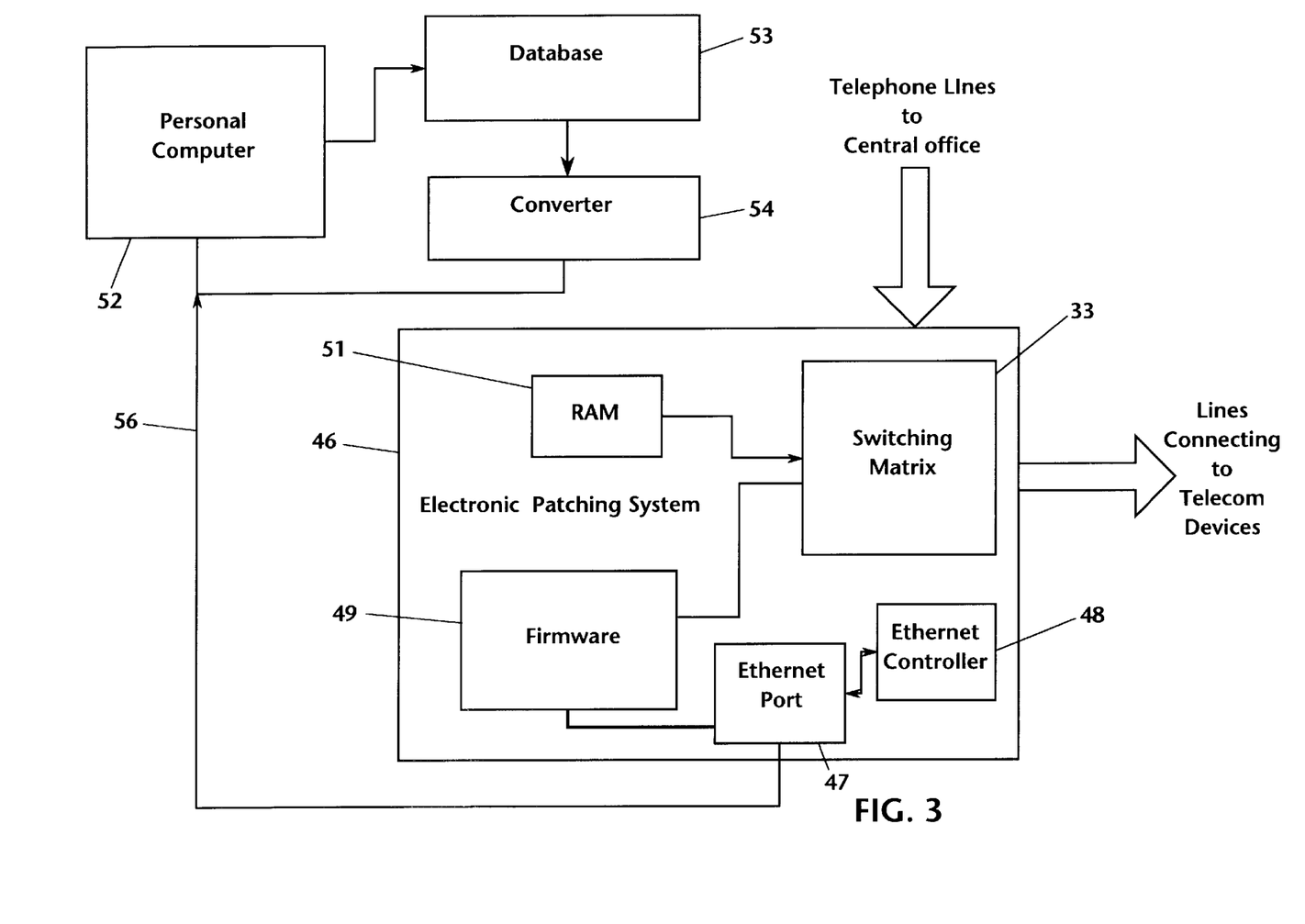
FIG. 3 is a block diagram of the major elements of the electronically programmable patching system of the present invention.

The broad concept of the invention is further defined in FIG. 3. The electronic patching system 46 described above includes the switching matrix 33, and the connections to the telephone and data lines of the telephone utility, and to the telecommunications devices in the local area surrounding the system 46. The control circuits 37 generally include an Ethernet port 47 (or any equivalent data transfer network), which is connected to an Ethernet controller 48. The system 46 also includes firmware 49 connected to the Ethernet port 47 and to the switching matrix 33, and a static RAM 51, also connected to the switching matrix 33.

Another significant aspect of the invention is that the programming source 38 may preferably comprise a personal computer 52, such as, but not limited to, a computer running an MS-DOS, Macintosh, UNIX, or other standard operating system. The listing of the connection relationships between each X and Y port of the switching matrix 33 is created in a database program 53 available in the prior art, such as FileMaker Pro or the like, which provides a graphical user interface to facilitate easy input and alteration of connection data. The database document is translated by a converter 54 into an instruction set for the electronic patching system 46, and transmitted thereto through line 56 extending to the Ethernet port 47 thereof. The converter 54 preferably comprises a software routine stored in the personal computer 52. The software routine is considered a portion of the present invention. A hardware converter is also a feasible option.

Thus, the operation of the system as depicted in FIG. 3 involves initially connecting the electronic patching system 46 to the telephone lines (and data lines) from the telephone utility, and trunk lines (and data lines) of an office, institution, or other establishment. The communications manager of the establishment then uses the personal computer 52 to run the database program 53 and set forth the desired connection pattern between the telephone lines and data lines and the telephone instruments and telecommunications devices. The database document is translated by converter 54 to an instruction set and downloaded through line 56 and the Ethernet port 47 to the electronic patching system 46. The downloaded instruction set is stored in RAM 51, and fed into the switching matrix 33 to establish the desired connection pattern.

It is significant to note that the connection pattern is not subject to alteration by the telephone utility switching system, or any other external factor or element. The connection pattern thus established remains in effect unless and until a new instruction set is created by the personal computer 52 and downloaded to the system 46. This programming link is preferably secured by password protection or encoding of various forms known in the prior art, and such security may permit the authorized use of more than one computer 52 to accomplish the programming.

Figure 4:
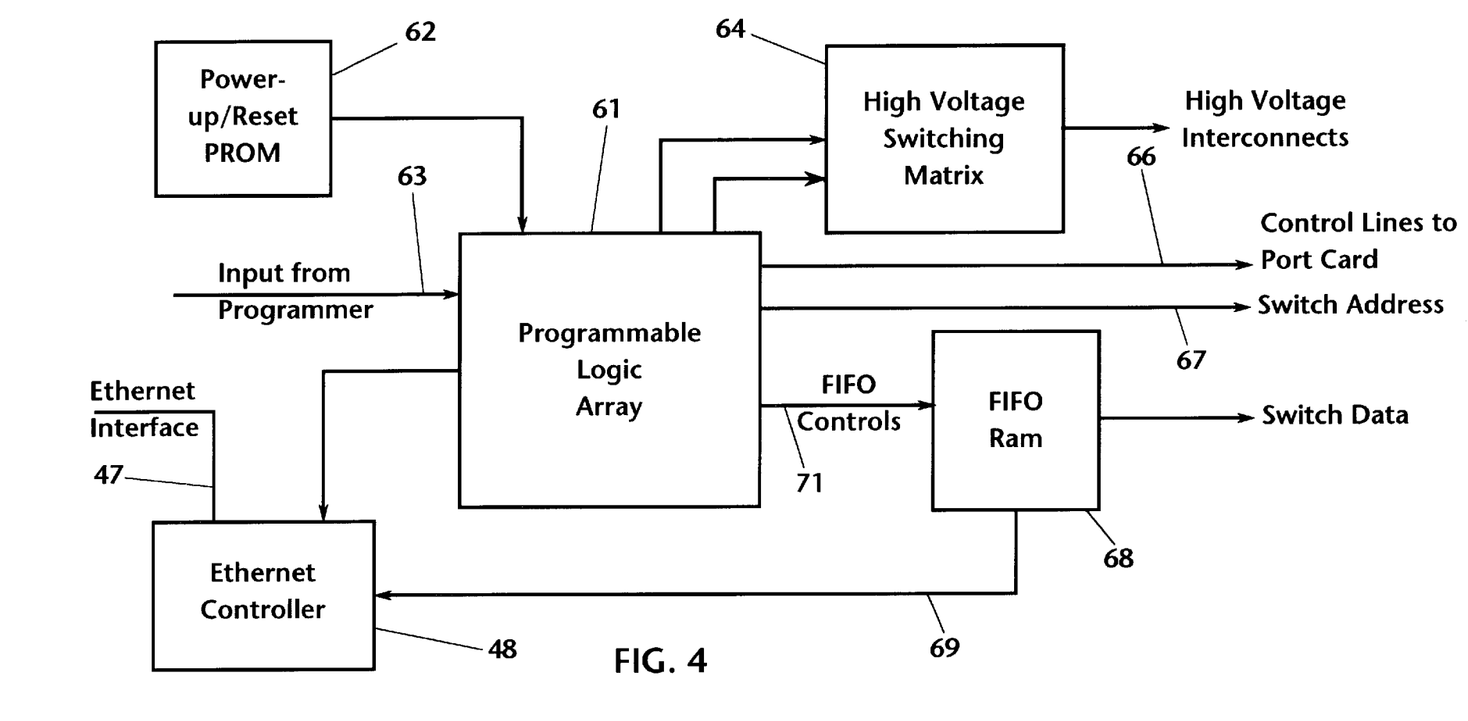
FIG. 4 is a block diagram of the programmable control system of the electronic patching system of the present invention.

With regard to FIG. 4, the firmware 49 of the system 46 generally comprises a programmable logic array (PLA) 61, such as a fully programmable gate array (FPGA) presently available commercially. A power-up/reset PROM 62 is connected to the PLA 61 to provide initial instructions on power-up that condition the PLA to accept further downloaded instructions. The PLA 61 further includes an input connection 63 for programming, which is obtained through Ethernet port 47, and the PLA 61 is also connected directly to the Ethernet controller 48.

The firmware 49 further includes a high voltage switching matrix 64 which is driven by the PLA 61. The high voltage switching matrix 64 is connected to analog telephone devices, modems, other and telecommunications devices, so that the high voltages that are typically carried on those lines are isolated from the lower voltages of digital lines. A first-in, first-out (FIFO) RAM 68 is connected through a programming bus 69 to the Ethernet controller 48, and it is also connected through a control line 71 to the PLA 61. Also, the PLA 61 includes an output control line 66 to the input/output port card, and line 67 to send switch addresses to the matrix 33.

Figure 5:
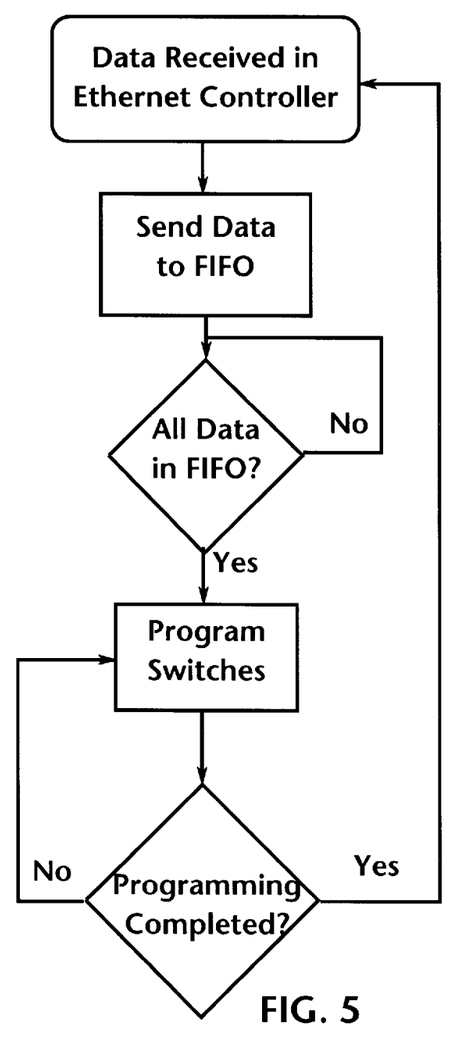
FIG. 5 is a flow chart depicting the programming steps for controlling the patching connections through the electronic patching system of the present invention.

The flow diagram for programming the system is charted generally in FIG. 5. Initially, in step 72 data is sent to the Ethernet controller 48. When the controller 48 is triggered, programming instructions are sent to the FIFO RAM 68. The data is loaded and stored in FIFO RAM 68 until all data has been received. At that point, the PLA directs the data from the RAM 68 to be transmitted serially to the switching matrix to program the switches and establish the desired connection pattern between the telecommunications devices and the telephone and data lines.

Figure 6:
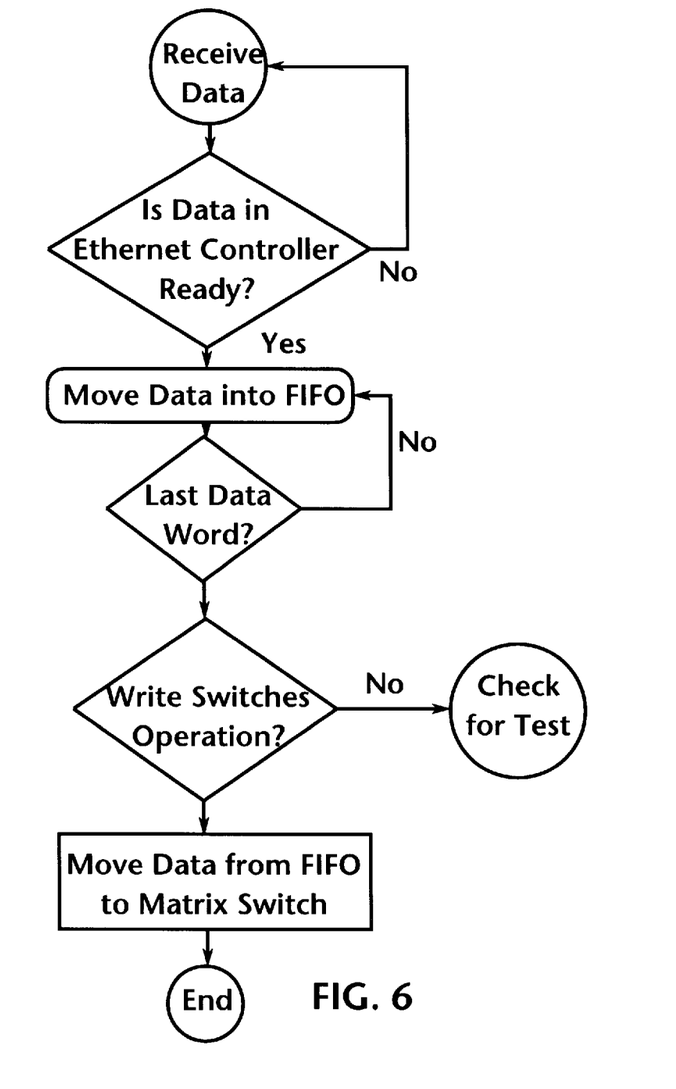
FIG. 6 is a flow chart depicting the operation of the Ethernet firmware of the present invention.

The flow diagram for operation of the firmware is charted generally in FIG. 6. A receive data state is set up when the Ethernet controller 48 is readied by loading address data from the PROM 62 through the PLA 61 to the controller. Programming data from line 63 is then moved through the PLA 61 into the FIFO RAM 68. The RAM 68 stores the data as 8 bit words which are loaded and counted as stored. These words contain the binary switch settings for each switch. When the last data word is received, the word count equals a preset number, and the FIFO RAM is actuated to transmit each word serially to the switch matrix. As each word is read the proper switch is set/reset until all of the words have been read and thus all the switches have been addressed. The data does not contain addresses of switches. Rather, the switch addresses are stored in a predetermined sequence in PLA 61, and are read out individually, each associated with the related sequentially read setting word from the FIFO RAM 68. This process continues until all words are read, and the routine ends.

All switches in the switch matrix are registered, so that the switch settings are fixed until it is reset or power is lost. Thus the connection pattern that is established by the downloaded instruction set is maintained without any further action by the system. However, a plurality of instruction sets may be written and stored, and downloaded in accordance with a fixed schedule to accommodate differing configurations of telephone connections that are optimized e.g., for office hours, non-business hours, weekend and holiday operation, and the like. Furthermore, if power is lost and the extant switch settings are lost, the system may be restored by downloading the instruction set that is appropriate for the day and time, and the desired connection pattern may be re-established within a matter of seconds.

Furthermore, it is apparent that one computer 52 may be employed to drive a plurality of electronic patching systems 46. Thus one computer operator or communications manager may control the patch connections of a very large number of telephone and data lines and telecommunications devices. The database that stores the connection data may be queried to provide reports of current status and switching operation, so that the communications manager can determine at any time which telephone and data lines are connected to which telephone devices. Telephone number, office number and location, name of office occupant or tenant, business hours, and the like may all be stored in associated data fields in the database, and this information is instantly available. The availability of this information is an extraordinary advance over prior art manually connected patch cable systems.

It is noted that all switching is accomplished with solid state switches, and that there are no moving parts to wear out and fail. The system handles standard 2 and 4 wire telephone wire systems, and well as 6 wire systems. Digital and analog telephones are accommodated, as well as data networks such as Ethernet, AppleTalk, token ring, and the like. The data passing through the system of the invention is not processed in any manner, although all signals are amplified to increase maximum line length and reliability.

Figures 7, 8:
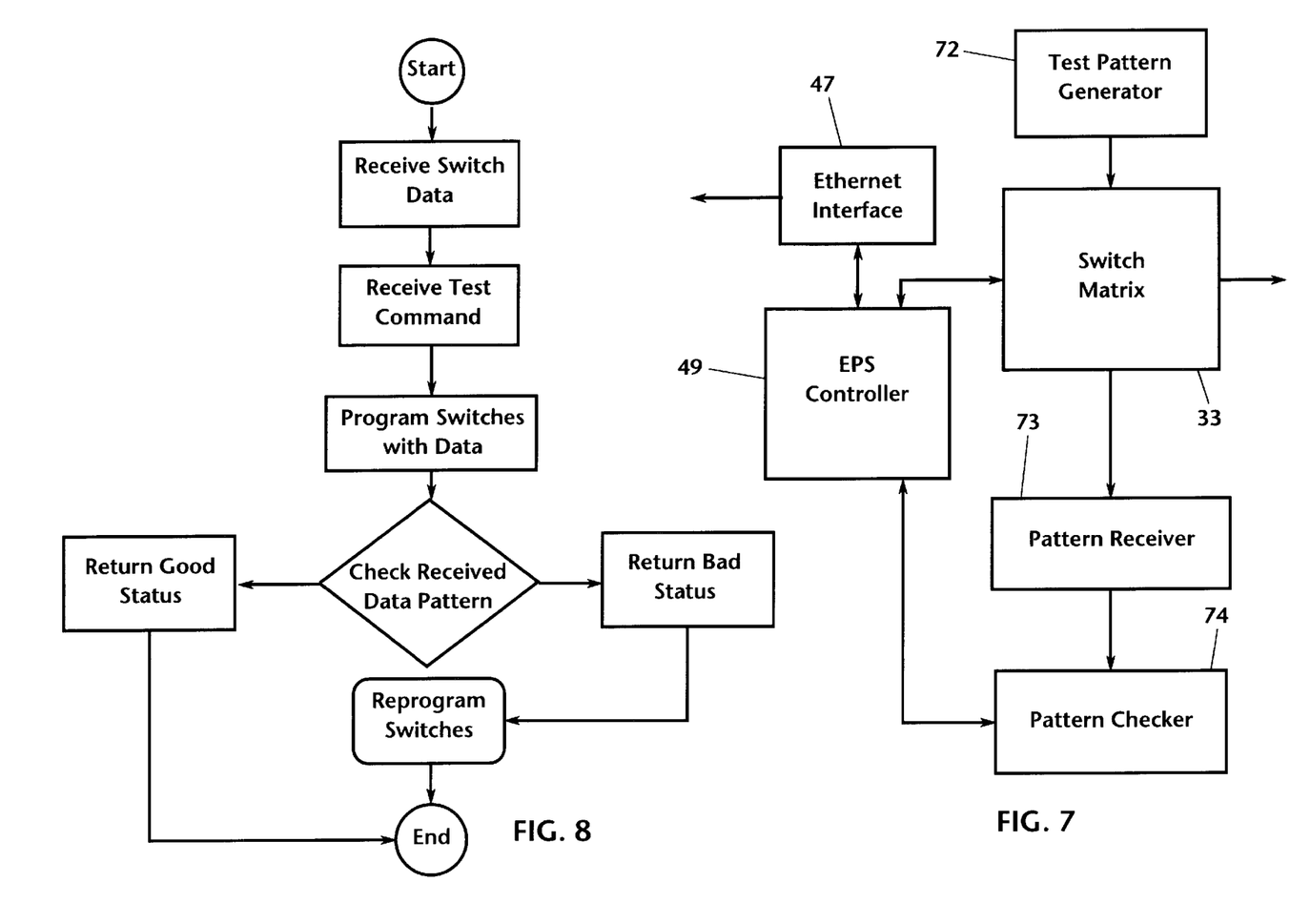
FIG. 7 is a functional block diagram of the line tester feature of the electronically programmable patching system of the present invention.
FIG. 8 is a flow chart depicting the operation of the line tester feature shown in FIG. 7.

An additional feature that may be provided by the electronic patching system of the invention comprises a line tester, shown in FIG. 7. A test pattern generator 72 is connected to the switch matrix 33, and a test pattern receiver 73 and patter checker 74 receive the output from the matrix 33. The output of the checker 74 is fed to the EPS controller 49, which in turn is connected to the Ethernet interface 47. The EPS controller 49 is also connected to the matrix 33, as noted in FIG. 3.

The operation of the line tester is depicted in the flow chart of FIG. 8. The test routine may be initiated whenever a line is first used; for example, whenever a telephone instrument is first used, the off-hook signal may trigger the test routine. The address data of the switch being used is sent to the controller 49, which returns a test command if the line tester feature is operating. The test pattern generator is then actuated to send a predetermined data pattern through the addressed switch, and the data pattern returned down the line is received by device 73 and compared to the original test pattern. If the comparison is favorable, the telephone or data line is labeled as operable (good status), the call (or data transfer) proceeds, and the line test subroutine ends. If the comparison indicates a problem in line quality or transmission, the line is labeled as inoperable (bad status), and the system reprograms the telephone instrument to be connected to another available telephone or data line. The subroutine then ends. The line status data may be transmitted through the Ethernet interface to the host computer when connection therewith is established, so that line fault problems will be reported promptly.

It may be appreciated that the line testing subroutine requires only a few microseconds to be completed, and due to the brevity of the routine, that the telephone user (or telecommunications device) is completely unaware of the procedure.

I claim:

1. An electronic patching system for connecting a plurality of telephone and data lines to a plurality of telecommunications devices, including:

an electronic switching matrix having first and second pluralities of input ports;

first means for connecting the plurality of telephone and data lines to said first plurality of input ports of said switching matrix;

second means for connecting the plurality of telecommunications devices to said second plurality of input ports of said switching matrix;

control means for operating said electronic switching matrix; and, programming means for directing said control means to cause said switching matrix to form electronic switch connections that establish a predetermined connection arrangement in point-to-point fashion between each of said plurality of telecommunications devices and at least one of the telephone and data lines;

said connection arrangement being substantially unchanged by telecommunications traffic passing through said electronic patching system;

said telecommunications traffic conducted through said electronic switching matrix without conversion or alteration of signal format.

2. The electronic patching system of claim 1, wherein said programming means includes database program means functioning on a computer for generating a database document listing the desired connection pattern between each of said plurality of telephone and data lines and each of said telecommunications devices.

3. The electronic patching system of claim 2, further including converter means for translating said database document into an instruction set, and means for transmitting said instruction set to said control means.

4. The electronic patching system of claim 3, wherein said control means includes a programmable logic array connected between said programming means and said switching matrix, said programmable logic array connected to receive said instruction set from said converter means.

5. The electronic patching system of claim 3, wherein said converter means includes a converter program operating on said computer.

6. The electronic patching system of claim 5, wherein said means for transmitting said instruction set includes a data transmission line extending from said computer to said control means.

7. The electronic patching system of claim 4, wherein said instruction set includes a plurality of data words, each data word directing one connection between one of said first plurality of input ports and one of said second plurality of input ports of said switching matrix, said instruction set being isolated from and unaffected by said telecommunications traffic.

8. The electronic patching system of claim 7, wherein said control means further includes a first-in, first out random access memory connected to said programmable logic array to receive said plurality of data words in a predetermined sequence.

9. The electronic patching system of claim 8, further including means for transmitting said data words from said first-in, first-out random access memory to said switching array in said predetermined sequence, whereby each of said first plurality of input ports is connected to a respective one of said second plurality of said input ports of said switching matrix.

10. The electronic patching system of claim 1, wherein said switching matrix includes a high voltage portion for connection to analog telecommunications devices, and a low voltage portion for connection to digital telecommunications devices.

11. The electronic patching system of claim 1, wherein said plurality of telephone lines includes data lines for data transmission.

12. The electronic patching system of claim 1, further including line tester means for checking the operability of each telecommunications connection made by said switching matrix.

13. The electronic patching system of claim 12, wherein said line tester means includes test pattern generator means for generating a predetermined data pattern.

14. The electronic patching system of claim 13, further including means for transmitting said predetermined data pattern through said switching matrix to a selected one of any of said telecommunications devices upon initiation of use of said selected one telecommunications device.

15. The electronic patching system of claim 14, further including means for receiving said data pattern from said selected one telecommunications device, and pattern checking means for comparing said predetermined data pattern from said test pattern generator means with said data pattern from said selected one telecommunications device.

16. The electronic patching system of claim 15, wherein said pattern checking means generates a good status signal in response to a favorable comparison of said data patterns, and generates a bad status signal in response to an unfavorable comparison of said data patterns.

17. The electronic patching system of claim 16, wherein said bad status signal is transmitted to said control means, said control means including means to reprogram said switching matrix and remediate the connection generating said bad status signal.

18. The electronic patching system of claim 1, wherein said plurality of telephone and data lines are switched lines, and said predetermined connection arrangement is a fixed pattern of interconnections between said first and second plurality of ports that is unaffected by telecommunications signals conducted through said switching matrix.

19. A method for interconnecting a plurality of telephone and data lines to a plurality of telecommunications devices in a desired connection pattern, including the steps of:

providing an electronically programmable switch matrix having first and second pluralities of ports;

connecting said first plurality of ports to said plurality of telephone and data lines and connecting said second plurality of ports to said plurality of telecommunications devices; and programming said electronically programmable switch matrix to form electronic switch connections that establish said desired connection pattern between each of said telephone and data lines and each of said telecommunications devices;

maintaining said connection pattern substantially unaltered by the telecommunications traffic passing through said electronically programmable switch matrix;

said telecommunications traffic conducted through said electronic switching matrix without conversion or alteration of signal format.

\* \* \* \* \*